July 7, 1925.

C. H. PATTEN

GUARD DEVICE FOR MOTOR VEHICLES

Filed Oct. 22, 1921

Inventor
C. H. PATTEN.

By

Attorneys

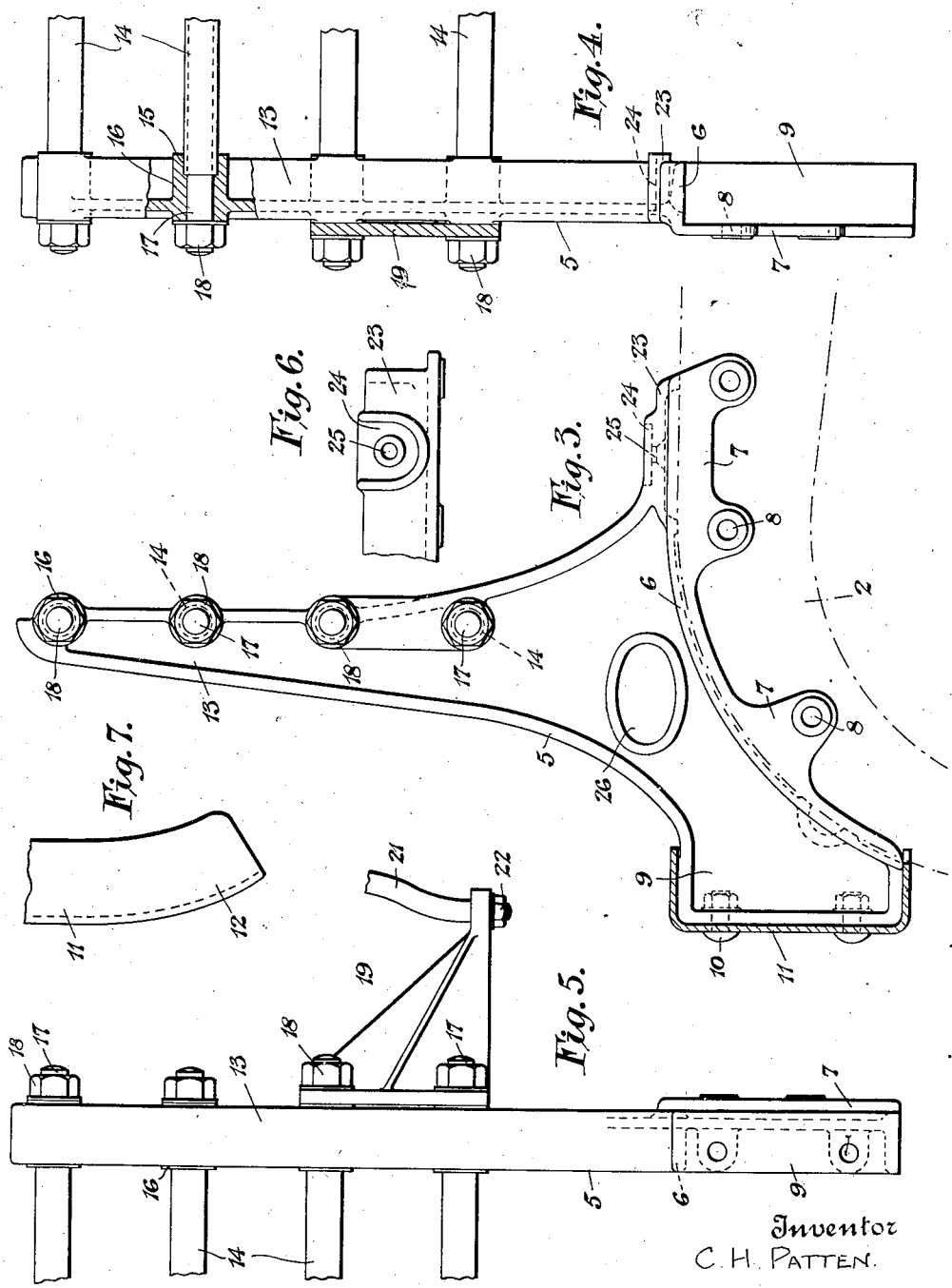

Patented July 7, 1925.

1,544,858

UNITED STATES PATENT OFFICE.

CHARLES H. PATTEN, OF CORNWELL HEIGHTS, PENNSYLVANIA, ASSIGNOR TO TRAYLOR ENGINEERING & MANUFACTURING COMPANY, OF ALLENTOWN, PENNSYLVANIA.

GUARD DEVICE FOR MOTOR VEHICLES.

Application filed October 22, 1921. Serial No. 509,685.

*To all whom it may concern:*

Be it known that I, CHARLES H. PATTEN, a citizen of the United States of America, residing at Cornwell Heights, Bucks County, State of Pennsylvania, have invented certain new and useful Improvements in Guard Devices for Motor Vehicles, of which the following is a specification.

This invention relates to an improved device for preventing the forward part of a motor vehicle from being damaged or injured in the event that the vehicle should run into another vehicle or other obstruction, or should be run into by another vehicle.

It is, of course, known to provide bumpers or guards carried by the forward ends of the vehicle chassis or framework, and also to provide a frame or guard positioned in front of the radiator, but these provisions are entirely separate and distinct from each other, some vehicles being provided with the bumper only and others having only the radiator guard.

The object of the present invention is to provide an improved protecting device or guard, which shall be in the nature of a unitary structure of great strength and rigidity which will not only extend in front of and protect or guard the forward part of the chassis and if desired, the front vehicle wheels also, but will also lie in front of the radiator of the vehicle and prevent injury thereto.

Another object of the invention is to provide a device or structure of the kind mentioned in the preceding paragraph which may be readily and economically manufactured and assembled and mounted in place on the vehicle framework, and which furthermore will be neat and attractive in appearance while possessing the necessary strength and rigidity necessary for the purpose intended.

A further object of the invention is to provide a structure adapted for the ready and convenient attachment and support of brackets or the like for carrying the headlights or lamps of the vehicle, thereby avoiding the necessity for the provision of mountings or supports for such headlights upon the vehicle frame or other parts.

The improved guard device according to one structural arrangement of the same is illustrated in the accompanying drawings in which Fig. 1 is a front view of a motor vehicle having the guard device applied thereto;

Fig. 3 is an enlarged side elevation of the guard device detached from the motor vehicle;

Fig. 4 is a rear view partly in section of one of the supporting brackets of the guard device and the parts of the radiator guard connected therewith;

Fig. 5 is a front view of the supporting bracket shown in Fig. 4 and showing the lamp bracket supported thereby;

Fig. 6 is a detail plan view of a part of the supporting bracket illustrated in Figs. 3 and 4 showing the means for receiving a radiator support or spring; and Fig. 7 is a detail plan view of one end of the bumper or guard member of the device.

Figure 2:
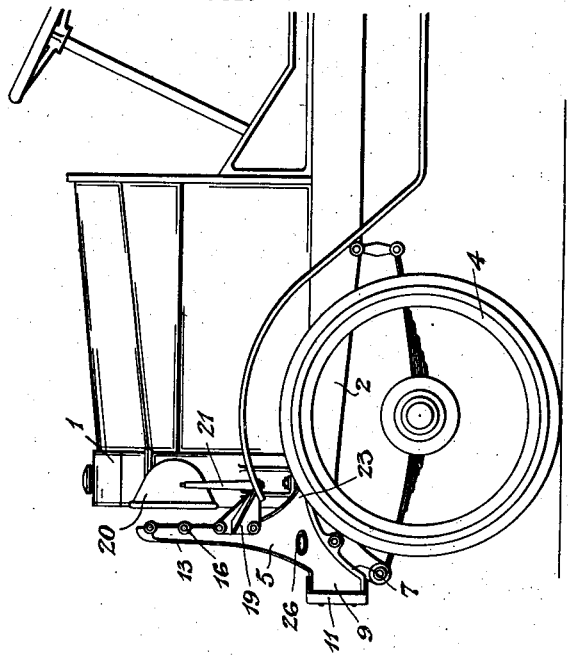
Fig. 2 is a side view of the forward portion of the motor vehicle illustrated in Fig. 1 showing the guard device in side elevation.
Figure 1:
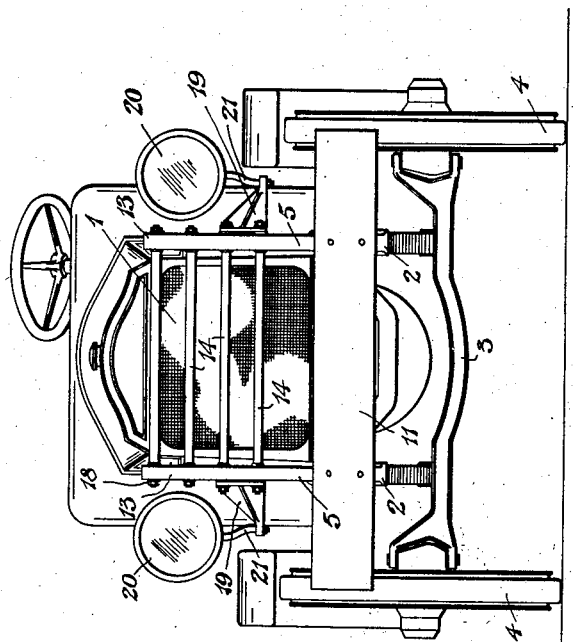

In these drawings Figs. 1 and 2 indicate generally the forward part of a motor vehicle having the radiator 1, longitudinally extending frame members 2, front axle 3 and steering wheels 4 carried thereby.

The guard device constructed in accordance with the present invention and in accordance with the particular structural arrangement thereof illustrated in the drawings comprises essentially a pair of supporting members or brackets 5 which are adapted to be rigidly secured to the frame members 2 of the motor vehicle. For this purpose the brackets are provided with base portions 6 which are curved forwardly and downwardly as indicated particularly in Figs. 2 and 3 in order that said portions may conform to and properly seat upon the forwardly and downwardly curved front portions of the frame members 2. The base portions 6 are provided with integral downwardly projecting flanges 7 adapted to seat against the outer side faces of the frame members 2, the brackets 5 being rigidly secured to the frame members by means of bolts or other securing devices passing through apertures 8 in the flange portions 7 and through corresponding apertures formed in the frame members 2.

The brackets are provided with lower forwardly projecting portions 9 to which is rigidly secured, as by means of bolts or like securing devices 10, a bumper or guard member 11, shown more particularly in Figs. 1, 2 and 3, and which is preferably of channel form so as to seat against the front and upper and lower faces of the forwardly extending portions 9 of the brackets. The ends of this bumper or guard member are preferably rearwardly bent in the manner indicated at 12 in Fig. 7. It will be seen that the bumper or guard member 11 extends transversely across the front of the vehicle in front of the framework thereof and serves to effectively prevent the vehicle framework from being injured by running into another vehicle or other obstruction or by being run into by another vehicle. The guard member preferably extends to about the position indicated in Fig. 1 although it may if desired extend a greater distance outwardly so as to fully protect the vehicle wheels from injury. The invention is not of course restricted to the use of a single guard member as illustrated, as more than one guard member may of course be provided.

The brackets 5 are provided with upstanding portions 13 lying at opposite sides of the radiator 1 and the radiator guard means is carried by these upstanding portions of the brackets.

In the specific arrangement illustrated the radiator guard comprises a plurality of members extending between the upstanding portions 13 of the brackets in substantially parallel relation as illustrated particularly in Fig. 1. These members are in the form of tubes 14 the ends of which are seated in recesses 15 in bosses 16 formed on the bracket portions 13. Extending through the tubes and through apertures in the bosses 16 are rods 17 which are threaded at their outer ends to receive nuts 18 which securely hold the rods and tubes in rigid assembly with the brackets. It will be seen that the tubes and rods extend transversely across the front of the radiator and provide a rigid guard means of great strength serving to entirely prevent the radiator from injury.

It is preferred to mount brackets 19 on the supporting members or brackets 5 which brackets 19 serve to support the headlights or lamps 20 of the vehicle. A convenient arrangement is to support the brackets 19 by means of the rods 17 or certain thereof which form parts of the radiator guard and as illustrated in the drawings, the two lower rods 17 are made somewhat longer than the others so that the base portions of the brackets 19 may be mounted on these rods and secured in place against the outer sides of the brackets 5 by means of the securing nuts 18. The lamp stems or supports 21 are secured to the outer ends of the brackets 19 by suitable nuts 22. This arrangement of the lamp brackets avoids the necessity for providing lamp supports or mountings upon the vehicle framework or upon the dash-board or mud-guard as is usual.

It is also desirable to construct the brackets 5 so that they may receive the supporting lugs or supporting springs by means of which the radiator 1 is mounted on the vehicle and to this end the rearwardly extending portions 23 of the brackets are provided with recessed portions or sockets 24 adapted to receive the radiator supports or springs which may be secured to the brackets by bolts or other securing devices passing through the apertures 25, Figs. 3 and 6.

The brackets 5 may also be provided with apertures 26, Figs. 2 and 3, adapted to receive towing ropes or chains or hooks thereon to enable the vehicle to be towed in the event that the same is disabled from any cause.

It will be readily understood that the construction described provides in effect a unitary guard structure having a part thereof positioned to prevent injury to the front portions of the vehicle frame and if desired the front wheels also and having another part positioned to prevent injury to the radiator of the vehicle, the structure preferably being also arranged to support the headlights or lamps of the vehicle and to support the radiator. The guard structure is very strong and rigid and adapted to be readily and economically manufactured and assembled and it also provides a neat appearance.

The invention is not, of course, restricted to the particular structural arrangement indicated, as this particular arrangement and the details of the same may be modified in various ways without departing from the scope of the invention as indicated in the claims appended hereto.

What I claim and desire to secure by Letters Patent is:

1. A device of the character referred to, comprising supporting means adapted to be secured to the longitudinal frame member of a motor vehicle, guard means mounted on said supporting means and positioned to extend transversely in front of the extreme forward end of the vehicle framework, and another guard means mounted on said supporting means and positioned in the rear of said first guard means to extend in front of the radiator of the vehicle.

2. A device of the character referred to, comprising a unitary structure adapted to be secured to the longitudinal frame members of a motor vehicle, having a part thereof adapted to serve as a bumper and positioned to extend transversely in front of the vehicle framework, and another part thereof positioned rearwardly of said first part so as to extend transversely in front of the radiator of the vehicle.

3. A device of the character referred to, comprising a pair of bracket adapted to be secured to the longitudinal frame members of a motor vehicle, guard means extending between and secured to said brackets and positioned thereby so as to extend transversely across the vehicle framework in advance of the extreme front end thereof, and another guard means extending between and secured to said brackets rearwardly of said first guard means so as to be positioned in front of the radiator of the vehicle.

4. A device of the character referred to, comprising a pair of brackets adapted to be secured to the frame members of a motor vehicle and having integral lower forwardly projecting portions and upwardly projecting portions, guard means extending between and secured to the forward ends of said forwardly projecting portions so as to be positioned in front of the vehicle framework, and another guard means positioned between and secured to said upwardly projecting portions so as to be positioned in front of the radiator of the vehicle.

5. A device of the character referred to, comprising a pair of brackets adapted to be secured to the frame members of the vehicle, a single guard member extending transversely between and secured to said brackets so as to be positioned in front of the vehicle framework to serve as a bumper member, and a plurality of substantially parallel horizontal guard members extending transversely between and secured to said brackets rearwardly of said guard member, so as to be positioned in front of the radiator of the vehicle.

6. A device of the character referred to, comprising a pair of brackets adapted to be secured to the frame members of a motor vehicle, guard means extending between and secured to said brackets so as to be positioned in front of the vehicle framework, and a radiator guard extending between said brackets and consisting of a plurality of rods carried by said brackets and a plurality of tubes surrounding said rods between said brackets.

7. A device of the character referred to, comprising a pair of brackets adapted to be secured to the frame members of a motor vehicle, guard means extending between and secured to said brackets so as to be positioned in front of the vehicle frame work, and a radiator guard extending between said brackets and consisting of a plurality of rods extending between and through said brackets, means for securing said rods to said brackets, and a plurality of tubes surrounding said rods between said brackets.

8. A device of the character referred to, comprising a pair of brackets adapted to be secured to the frame members of a motor vehicle, guard means extending between and secured to said brackets so as to be positioned in front of the motor framework, said brackets having recesses in the inner faces thereof, and a radiator guard between said brackets and consisting of a plurality of tubes extending between said brackets and having their ends seated in said recesses, a plurality of rods extending through said tubes and through said brackets, and means for securing said rods to said brackets.

9. A device of the character referred to, comprising a unitary structure adapted to be secured to the framework of a motor vehicle, having a part thereof positioned to extend transversely in front of the vehicle framework, and another part thereof adapted to extend transversely in front of the radiator of the vehicle and having brackets for supporting the headlights of the vehicle.

10. A device of the character referred to, comprising a pair of brackets adapted to be secured to the frame members of a motor vehicle, guard means extending between and secured to said brackets so as to be positioned in front of the vehicle framework, a radiator guard extending between said brackets and including a plurality of substantially parallel members passing through said brackets, means for securing said members to said brackets, and lamp brackets mounted on certain of said members and secured in place by said securing means.

11. A device of the character referred to, comprising a unitary structure adapted to be secured to the framework of a motor vehicle, having a part thereof positioned to extend transversely in front of the vehicle framework, and another part thereof adapted to extend transversely in front of the radiator of the vehicle and having means adapted to receive the radiator supports.

12. A device of the character referred to, comprising a pair of brackets adapted to be secured to the frame members of a motor vehicle, guard means extending between and secured to said brackets so as to be positioned in front of the vehicle framework, and a radiator guard extending between the upstanding portions of said brackets so as to be positioned in front of the radiator of the vehicle, said brackets having rearwardly extending portions provided with sockets to receive the radiator supports.

13. In a motor vehicle, in combination with the framework of said vehicle, supporting means secured to the longitudinal members of said framework, a bumper device carried by said supporting means and extending transversely in front of said framework, and guard means carried by said supporting means rearwardly of said bumper device and extending in front of the radiator of the vehicle.

14. In a motor vehicle, in combination with the framework of said vehicle, a pair of brackets rigidly secured to the longitudinal frame members of said framework, a bumper device extending between and secured to said brackets and positioned transversely in front of the said framework, and a radiator guard extending between and secured to said brackets and in the rear of and above said bumper device, positioned in front of the radiator of the vehicle.

15. In a motor vehicle, in combination with the framework of said vehicle, supporting means rigidly secured to said framework, guard means carried by said supporting means and extending transversely in front of the framework, guard means carried by said supporting means and positioned thereby to extend in front of the radiator of the vehicle, and headlight supporting brackets carried by said supporting means.

16. In a motor vehicle, in combination with the framework of said vehicle, supporting members rigidly secured to the side frame members of said framework, guard means carried by said supporting members and extending transversely in front of the vehicle framework, guard means carried by said supporting members and positioned thereby to extend in front of the radiator of the vehicle, and means on said supporting members adapted to receive the radiator supports or springs.

In testimony whereof I affix my signature.

CHARLES H. PATTEN.